US012696887B2

(12) United States Patent　(10) Patent No.:　US 12,696,887 B2
Toake et al.　(45) Date of Patent:　Aug. 4, 2026

(54) FISHING INFORMATION PROCESSING SYSTEM, FISHING REEL, FISHING ROD, AND FISHING INFORMATION PROCESSING PROGRAM

(71) Applicant: Shimano Inc., Sakai (JP)

(72) Inventors: Youhei Toake, Sakai (JP); Shouji Nakagawa, Sakai (JP); Shu Kusuda, Sakai (JP)

(73) Assignee: Shimano Inc., Osaka (JP)

( * ) Notice: Subject to any disclaimer, the term of this patent is extended or adjusted under 35 U.S.C. 154(b) by 217 days.

(21) Appl. No.: 18/367,268

(22) Filed: Sep. 12, 2023

(65) Prior Publication Data

US 2024/0215560 A1　Jul. 4, 2024

(30) Foreign Application Priority Data

Dec. 28, 2022　(JP) ................................. 2022-211942

(51) Int. Cl.
A01K 89/015　　(2006.01)
(52) U.S. Cl.
CPC ................................ A01K 89/0178 (2015.05)

(58) Field of Classification Search
CPC .... A01K 89/0178; A01K 89/00; A01K 97/00; A01K 97/125; A01K 89/015; A01K 87/00; G06Q 50/02; G06Q 50/10
See application file for complete search history.

(56) References Cited

U.S. PATENT DOCUMENTS

| | | | | |
|---|---|---|---|---|
| 2014/0358483 A1 * | 12/2014 | da Rosa | ................. | A01K 97/00 702/188 |
| 2016/0353725 A1 * | 12/2016 | Worley, III | .......... | A01K 87/007 |
| 2022/0061292 A1 * | 3/2022 | Yasuda | ................ | A01K 89/015 |

FOREIGN PATENT DOCUMENTS

| | | | | |
|---|---|---|---|---|
| CN | 114097737 A | * | 3/2022 | ........... A01K 89/015 |
| JP | 2022-38636 A | | 3/2022 | |

* cited by examiner

*Primary Examiner* — Rufus C Point
(74) *Attorney, Agent, or Firm* — Spencer Fane, LLP

(57) ABSTRACT

A fishing information processing system includes an acquisition unit that acquires prescribed fishing information, a determination unit that determines an event occurred based on the prescribed fishing information acquired by the acquisition unit, and a first storage control unit that causes a first storage unit to store the prescribed fishing information, from a prescribed time before the time that it is determined by the determination unit that an event has occurred, as event information.

19 Claims, 8 Drawing Sheets

FISHING INFORMATION PROCESSING SYSTEM, FISHING REEL, FISHING ROD, AND FISHING INFORMATION PROCESSING PROGRAM

CROSS-REFERENCE TO RELATED APPLICATIONS

This application claims priority to Japanese Patent Application Nos. 2022-211942, filed on Dec. 28, 2022. The entire disclosure of Japanese Patent Application No. 2022-211942 are hereby incorporated by reference.

BACKGROUND

Technical Field

Fishing information processing system, fishing reel, fishing rod, and fishing information processing program.

Background Information

A fishing reel is known that can record information, such as line length, handle speed, and position, in accordance with a user operation to record an event that occurs during actual fishing, such as a fish being pulled in, a fish being hooked, or a hook becoming snagged (for example, see Japanese Laid-Open Patent Application No. 2022-038636).

SUMMARY

However, it has been determined that when such events occur during actual fishing, the user is often preoccupied with dealing with the event itself and may forget to perform the operation to record the event or fail to do so at the appropriate time.

For this reason, storing (recording) accurately event-related information corresponding to the occurrence of the event is desired.

In addition, the occurrence of an event is only a consequence, and it is important to store the process of the event. For example, it is desired to store accurately what type of action (reel operation, rod operation, etc.) was performed in what type of environment (tide, weather, etc.) that led to the occurrence of the event (a successful case such as a fish hit, or an unsuccessful case such as snagging or backlash).

In consideration of the problem described above, an object of embodiments of the present invention is to record accurately the process leading up to an event, as well as the information related to the event that occurred during actual fishing.

A first aspect of the present disclosure that solves the problem described above is a fishing information processing system, comprising an acquisition unit that acquires prescribed fishing information, a determination unit that determines an event occurred, based on the prescribed fishing information acquired by the acquisition unit, and a first storage control unit that causes a first storage unit to store the prescribed fishing information, from a prescribed time before the time that it is determined by the determination unit that an event has occurred, as event information.

By the configuration described above, when a prescribed event occurs during actual fishing, it is possible to store, as event information, from among information stored at the time of actual fishing in accordance with the event, prescribed fishing information from a prescribed time before the occurrence of the event. As a result, the storage of information related to the event that occurred during actual fishing is performed accurately. Prescribed fishing information from a prescribed time before the occurrence of the event, that is, the cause leading up to the event can be stored accurately.

A second aspect of the present disclosure is the fishing information processing system according to the first aspect, wherein the prescribed fishing information acquired by the acquisition unit is reel information related to a fishing reel.

By the configuration described above, information related to the fishing reel at the time of actual fishing can be included in the event information.

A third aspect of the present disclosure is the fishing information processing system according to the second aspect, wherein the reel information can include at least some of the following: information related to when the fishing reel was used, information related to the number of times that the fishing reel was used, information related to the spool of the fishing reel, information related to the fishing line wound around the spool of the fishing reel, information related to the braking control settings of the spool of the fishing reel, and information related to the drag settings of the fishing reel.

By the configuration described above, information related to the use of the fishing reel, information related to the fishing line, braking control settings of the spool, drag settings, and the like, can be included in the event information as information related to the fishing reel.

A fourth aspect of the present disclosure is the fishing information processing system according to second or third aspect, wherein the reel information can be reel operation information related to operations performed with respect to the fishing reel.

By the configuration described above, information related to the operation of the fishing reel can be included in the event information as information related to the fishing reel.

A fifth aspect of the present disclosure is the fishing information processing system according to the fourth aspect, wherein the reel operation information can include at least some of the following: information related to the handle operation of the fishing reel, information related to the clutch operation of the fishing reel, information related to the drag operation of the fishing reel, and information related to the rotation of the spool of the fishing reel.

By the configuration described above, various types of information can be included in the event information as information related to the operation of the fishing reel.

A sixth aspect of the present disclosure is the fishing information processing system according to the fourth or fifth aspect, wherein the reel operation information can include reel change information, including at least some of the following: information related to changes in tension on the fishing line wound around the spool of the fishing reel, information related to changes of the fishing line in the line pay-out direction, and information related to changes in the rotation of the handle of the fishing reel.

By the configuration described above, various types of information (reel change information) pertaining to prescribed changes according to the operation can be included in the event information as information related to operation of the fishing reel.

A seventh aspect of the present disclosure is the fishing information processing system according to the sixth aspect, wherein the determination unit can determine an event occurred based on the reel change information.

By the configuration described above, it is possible to determine an event occurred with good accuracy based on the reel change information.

An eighth aspect of the present disclosure is the fishing information processing system according to any one of the first through seventh aspects, wherein the prescribed fishing information acquired by the acquisition unit is rod information related to a fishing rod.

By the configuration described above, event information can be stored using information obtained pertaining to the fishing rod during actual fishing.

A ninth aspect of the present disclosure is the fishing information processing system according to the eighth, wherein the rod information can include at least some of the following: information related to when the fishing reel was used, information related to the number of times that the fishing reel was used, information related to rigidity of the fishing rod, and information related to condition of the fishing rod.

By the configuration described above, the usage history of the rod and information related to the specifications of the rod can be included in the event information.

A tenth aspect of the present disclosure is the fishing information processing system according to the eighth or ninth aspect, wherein the rod information can be rod operation information related to the operation of the fishing rod.

By the configuration described above, it is possible to obtain accurate event information, including rod operation information indicating how a user operated the rod.

An eleventh aspect of the present disclosure is the fishing information processing system according to the tenth aspect, wherein the rod operation information can include at least some of the following: information related to the speed of operation of the fishing rod, information related to vibration transmitted to the fishing rod, information related to the angle of the fishing rod, and information related to the orientation of the fishing rod.

By the configuration described above, it is possible to obtain accurate event information, including various types of rod operation information.

A twelfth aspect of the present disclosure is the fishing information processing system according to the tenth or eleventh aspect, wherein the rod operation information can include rod change information, including at least some of the following: information related to changes in the condition of the fishing rod, information related to changes in the operation speed of the fishing rod, information related to changes in vibration transmitted to the fishing rod, information related to changes in the angle of the fishing rod, and information related to changes in the orientation of the fishing rod.

By the configuration described above, it is possible to obtain accurate event information, including information related to changes in the fishing rod that occur during actual fishing.

A thirteenth aspect of the present disclosure is the fishing information processing system according to the twelfth aspect, wherein the determination unit can determines to occurred an event based on the rod change information.

Another aspect of the present disclosure is a fishing information processing system according to the twelfth aspect.

By the configuration described above, it is possible to determine an event occurred with good accuracy using changes in the condition of the fishing rod.

A fourteenth aspect of the present disclosure is the fishing information processing system according to any one of the first to thirteenth aspects, wherein the prescribed fishing information acquired by the acquisition unit can be trip information related to a fishing trip.

By the configuration described above, it is possible to generate useful event information including information obtained in relation to a fishing trip (actual fishing).

A fifteenth aspect of the present disclosure is the fishing information processing system according to the fourteenth aspect, wherein the trip information can include at least some of the following: information related to the time of the fishing trip, information related to the number of fishing trips, information related to the location of the fishing trip, information related to the temperature during the fishing trip, information related to the weather during the fishing trip, information related to the barometric pressure during the fishing trip, information related to wind direction during the fishing trip, and information related to wind force (wind speed) during the fishing trip.

By the configuration described above, it is possible to include a variety of trip information in the event information.

A sixteenth aspect of the present disclosure is the fishing information processing system according to any one of the first to the fifteenth aspect, further comprising a second storage control unit that causes a second storage unit to continuously store the prescribed fishing information acquired by the acquisition unit as accumulated information, wherein the first storage control unit can cause the first storage unit to store, as event information, the accumulated information from a prescribed time before the time that it is determined by the determination unit that an event has occurred.

By the configuration described above, it is possible to accumulate information obtained at the time of actual fishing, thereby accurately obtaining event information from the accumulated information.

A seventeenth aspect of the present disclosure is the fishing information processing system according to the sixteenth aspect, which can further comprise a transmission unit that transmits the accumulated information and/or the event information to an external device.

By the configuration described above, information (accumulated information, event information) obtained in relation to fishing can be provided among the terminals of a plurality of users. That is, information obtained in relation to fishing can be shared among users.

An eighteenth aspect of the present disclosure is a fishing reel equipped with the fishing information processing system according to any one of the first through seventeenth aspects.

A nineteenth aspect of the present disclosure is a fishing rod equipped with the fishing information processing system according to any one of the first through seventeenth aspect.

A twentieth aspect of the present disclosure is the fishing information processing program for causing a computer to function as the fishing information processing system according to any one of the first through seventeenth aspect.

By the present disclosure, it is possible to achieve the effect that information related to an event that occurred at the time of actual fishing can be stored accurately.

DETAILED DESCRIPTION OF EMBODIMENTS

First Embodiment

Configuration Example of the Fishing Information Processing System

Figure 1:
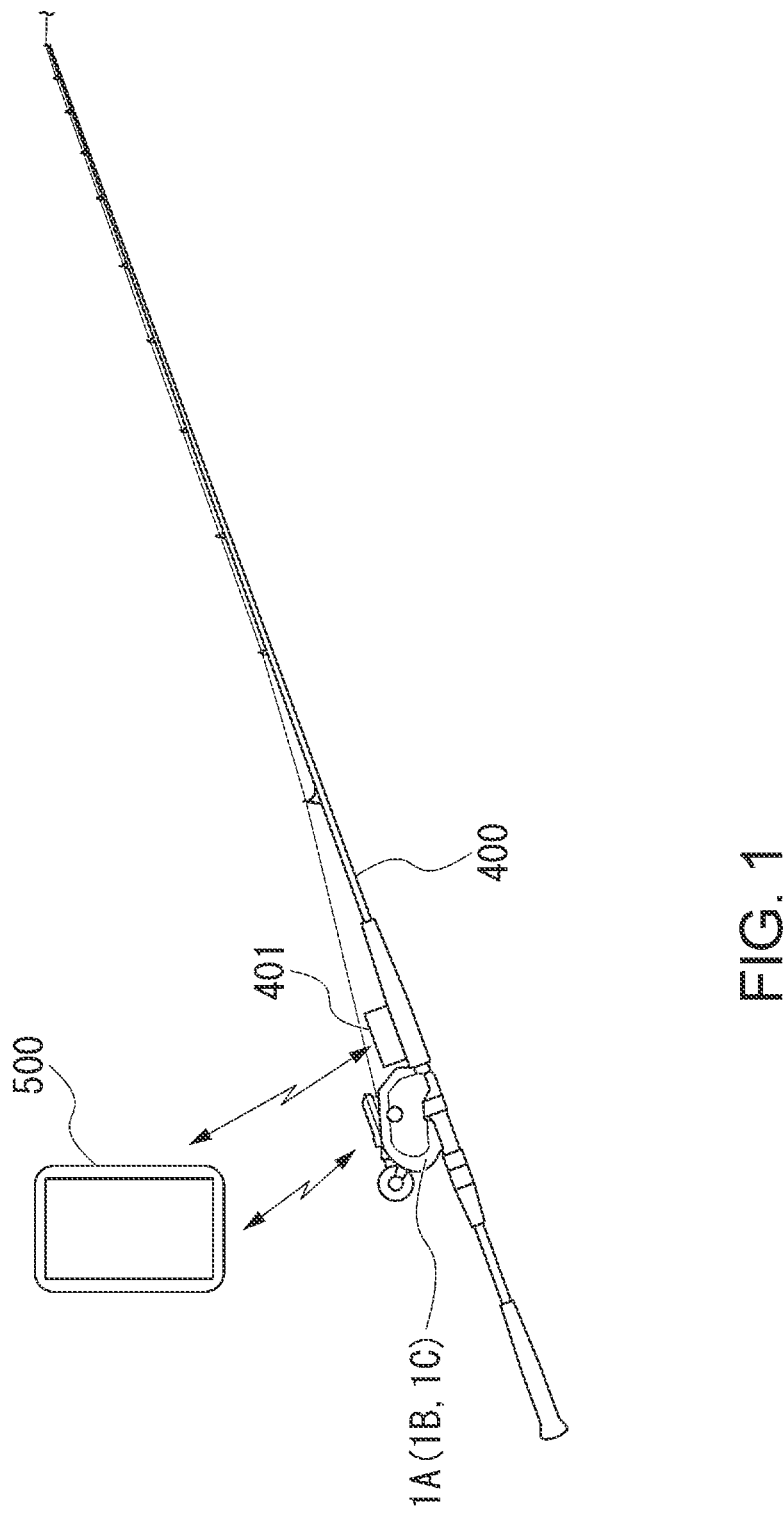
FIG. 1 is an example of the overall configuration of the fishing information processing system according to a first embodiment.

FIG. 1 shows an example of the overall configuration of a fishing information processing system according to the present embodiment. The fishing information processing system of FIG. 1 comprises a fishing reel 1A, a fishing rod 400 (one example of a fishing rod), and a user terminal 500.

The fishing reel 1A is mounted on the fishing rod 400 for use. In FIG. 1, a fishing rod sensor unit 401 provided on the fishing rod 400 corresponds to a second embodiment, so that its description is omitted here.

The user terminal 500 is used by a user who is an angler. The user terminal 500 can be, for example, a smartphone, a tablet terminal, or the like.

The fishing reel 1A is communicatively connected to the user terminal 500. Communication between the user terminal 500 and the fishing reel 1A can be wireless or wired, but wireless communication will be described below as an example. In addition, the wireless communication method between the user terminal 500 and the fishing reel 1A is not particularly limited and can be short-range wireless communication, such as BLE (Bluetooth Low Energy), NFC (Near Field Communication), etc.

Example of the Structure of the Fishing Reel

In the present embodiment, the case in which the fishing reel 1A is an electric reel is used as an example.

Figure 2:
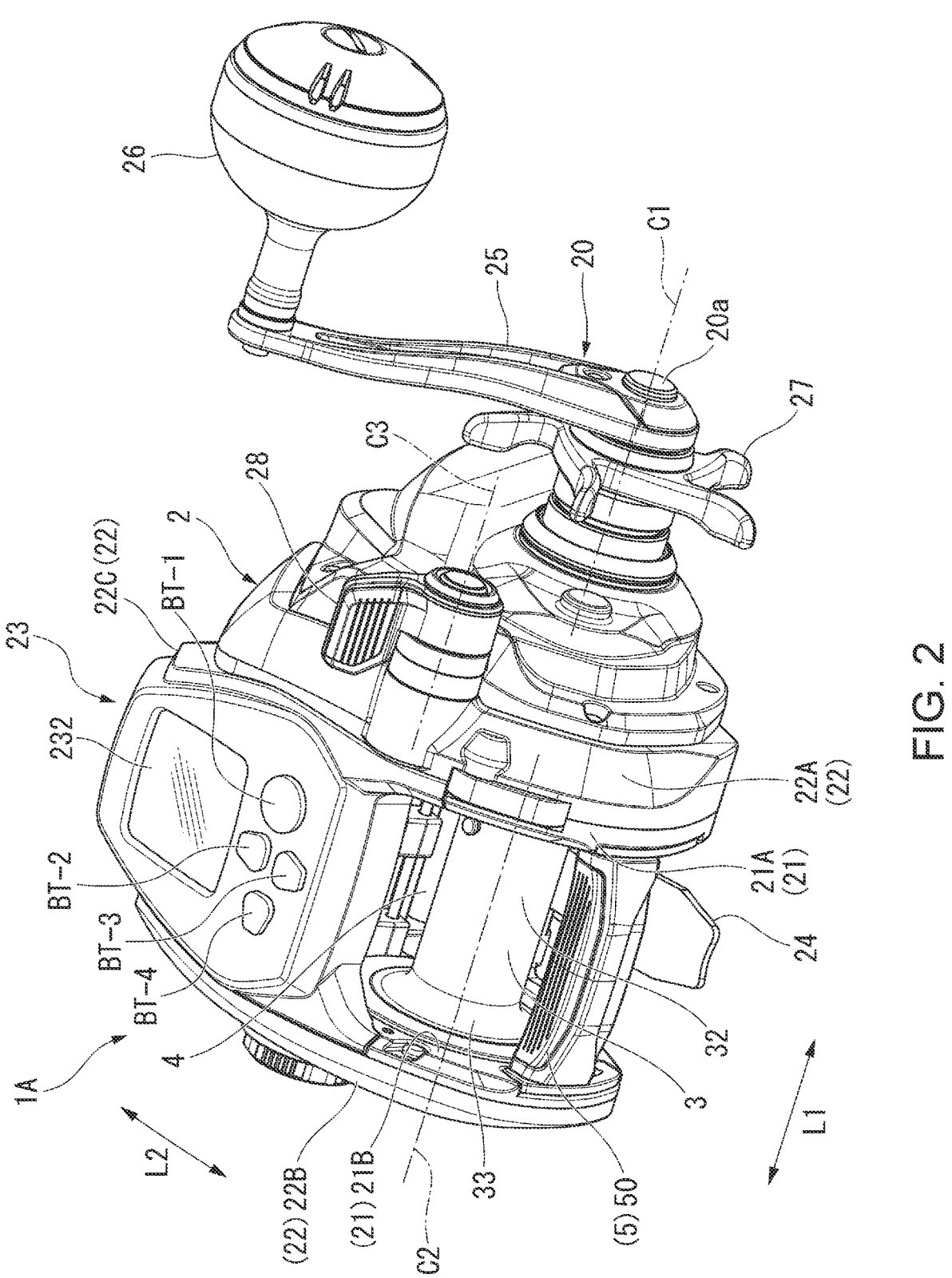
FIG. 2 is an example of the external appearance of the fishing reel as an electric reel according to the first embodiment.
Figure 3:
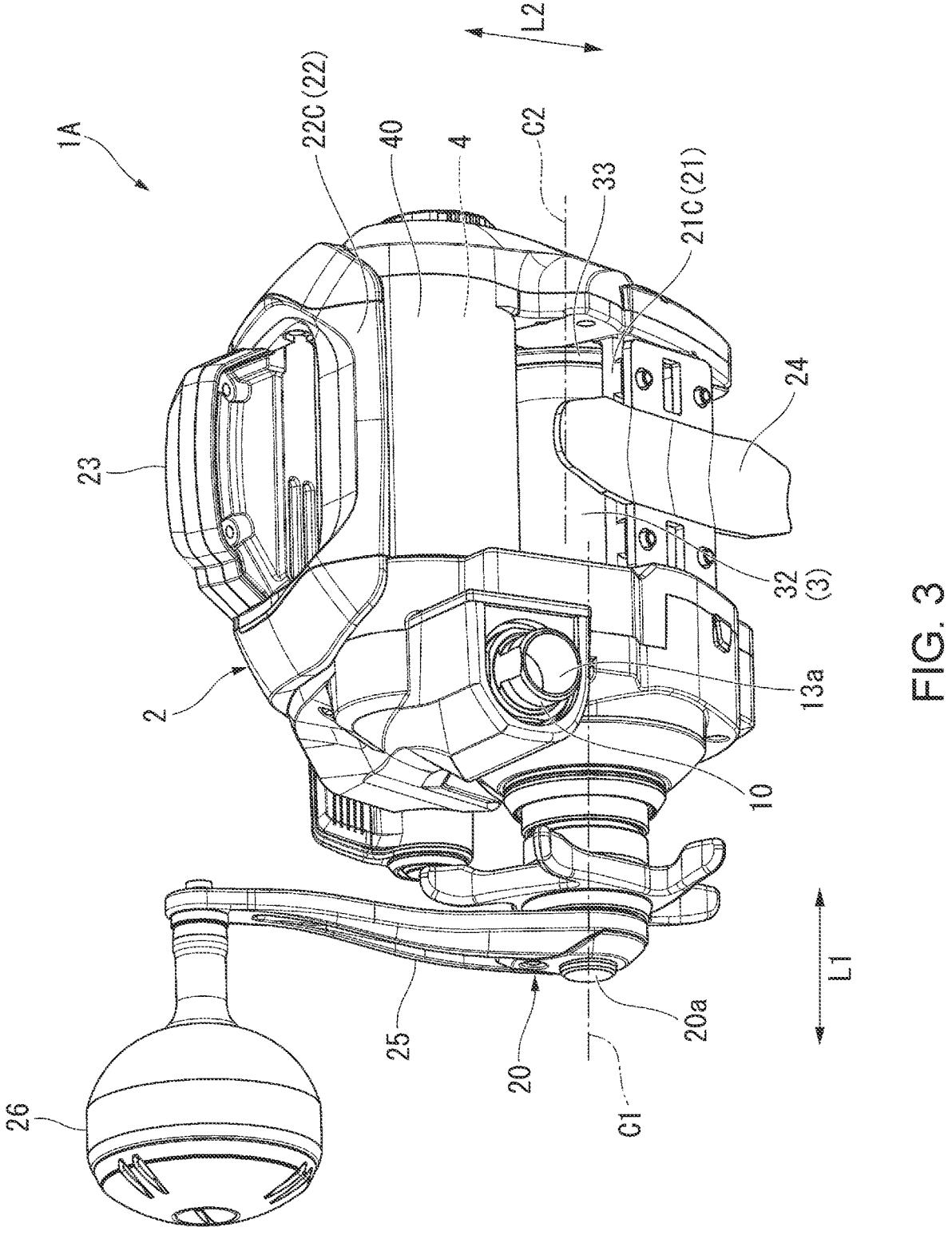
FIG. 3 is an example of the external appearance of the fishing reel as an electric reel according to the first embodiment.

FIGS. 2 and 3 show an example of the external appearance of the fishing reel 1A as an electric reel. The fishing reel 1A shown in FIGS. 2 and 3 is driven by the electric power supplied from an external power source and also has an internal power source for use as a hand-wound dual-bearing reel.

The fishing reel 1A comprises a reel body 2 that can be mounted on the fishing rod, a handle 20 that is attached to the reel body 2 so as to be rotatable about a handle axis C1, a spool 3 rotatable about a spool axis C2 that is parallel to handle axis C1 with respect to the reel body 2 and around which a fishing line, not shown, can be wound, and a motor 4 disposed in the reel body 2 that a transmits rotational drive force to the spool 3.

The fishing reel 1A also has a clutch mechanism 5. The clutch mechanism 5 is a mechanical part configured to be able to switch between a connected (clutch-on) state in which the spool 3 and the handle 20 are connected and a disconnected (clutch-off) state in which the spool 3 and the handle 20 are disconnected. The clutch can be switched between the clutch-on state and the clutch-off state by operation of a clutch operating member 50 by an angler as the user.

Here, in the present embodiment, the handle axis C1 and the spool axis C2 are parallel, in the direction necessarily defined as the left-right direction L1; the direction that is orthogonal to the left-right direction L1 and in which the fishing line is wound around the spool 3 and is paid out (i.e., cast) is defined as the front-rear direction L2. Further, the direction in which the fishing line is paid out from the spool 3 in the front-rear direction L2 is defined as the front, the opposite direction is defined as the rear, and left and right are defined in relation to the fishing reel 1A as seen from the rear.

FIG. 2 is a perspective view of the fishing reel 1A as seen obliquely from above and the rear, and FIG. 3 is a perspective view of the fishing reel 1A as seen obliquely from below and the front.

The reel body 2 comprises a body frame 21, a cover 22 that covers a portion of the body frame 21, and a display operation panel part 23 positioned above the body frame 21.

The body frame 21 is an integrally formed member made of synthetic resin or metal, for example. Sandwiching the spool 3 in the left-right direction L1, the body frame 21 has a right-side plate 21A on the handle 20 side and a left-side plate 21B opposite the right-side plate 21A, and a plurality of connecting members 21C that connect the right-side plate 21A and the left-side plate 21B.

The right-side plate 21A and the left-side plate 21B are separated from each other in the left-right direction L1. Further, support portions that support the spool 3 and the motor 4, and a rotary drive mechanism such as the clutch mechanism 5, are disposed on each of the side plates 21A, 21B.

The ends of a rotary shaft (not shown) of the spool 3 are supported and attached to the right-side plate 21A and the left-side plate 21B so as to be freely rotatable. One of the connecting members 21C is fitted with a fishing rod mounting portion 24 for attachment to the fishing rod at approximately the central portion in the left-right direction L1.

The cover 22 includes a right-side cover 22A, a left-side cover 22B, and a front cover 22C. The right-side cover 22A covers the right-side plate 21A with a prescribed housing space therebetween, and is, for example, screwed onto the outer edge of the right-side plate 21A. The left-side cover 22B covers the left-side plate 21B with a prescribed housing space therebetween, and is, for example, screwed onto the outer edge of the left-side plate 21B. The front cover 22C covers the front portion of the body frame 21.

Further, although not shown, a connector for connecting a power supply cable from the outside is disposed on the lower front portion of the right-side plate 21A.

The display operation panel part 23 is directed toward the angler that uses the fishing reel 1A and is the part operated by the angler (button operation in this embodiment).

The display operation panel part 23 is located between the right-side plate 21A and the left-side plate 21B. The display operation panel part 23 has a button section 231 and a display surface section 232.

The button section 231 is the section where button operations are performed by the angler. In the example shown in the figure, four buttons (operators) are arranged in the button section 231: a first button BT-1, a second button BT-2, a third button BT-3, and a fourth button BT-4.

In the following description, when no specific distinction is to be made, the first button BT-1, the second button BT-2, and the third button BT-3 will be referred to as button BT.

The first button BT-1 is used in an operation in which the spool 3 is electrically rotated at a preset speed pattern.

Specifically, the first button BT-1 is normally used for temporary motor winding operation. Temporary motor winding is an operation for driving the motor 4 so that the spool 3 rotates at a preset constant speed as a speed pattern when the first button BT-1 is pressed. The rotational speed of the spool 3 during temporary motor winding can be changed by angler operation.

Further, the first button BT-1 is operated to instruct the execution of a jigging function in jigging mode. The jigging function is used to rotate the spool 3 with a preset jigging pattern as the speed pattern in response to a single pressing operation of the first button BT-1. The jigging pattern is set, for example, to achieve an operation in which the spool 3 is rotated to wind the fishing line at a prescribed speed for a set period of time, and then the rotation of the spool 3 is stopped for a set period of time.

The display surface section 232 is the section where prescribed contents are displayed in accordance with an operation of the fishing reel 1A. The display device disposed at the display surface section 232 is not particularly limited, but can include, for example, a liquid-crystal display device, an organic EL display device, and the like.

As shown in FIGS. 2 and 3, the handle 20 has a handle arm 25 that is non-rotatably fixed to the distal end portion 20a of the handle shaft, a handle knob 26 that is mounted on one end of the handle arm 25 freely rotatable about an axis parallel to the handle axis C1, and a drag 27 disposed on the reel body 2 side.

The torque from the handle 20 is directly transmitted to the spool 3 when the clutch mechanism 5 is in the clutch-on state.

The spool 3 is freely rotatable between the right-side plate 21A and the left-side plate 21B by shaft bearings (not shown). The spool 3 includes a rotary shaft, not shown, a cylindrical bobbin trunk 32 that is disposed coaxially with the spool rotary shaft and that can rotate in conjunction therewith, and a flange portion 33 on each end of the bobbin trunk 32 whose diameter expands radially outwardly.

The spool 3 is rotationally driven by the motor 4 via a spool drive mechanism, not shown, and is interlocked with the clutch mechanism 5 that is driven by the clutch operating member 50. The spool rotary shaft is supported by the right-side cover 22A and the left-side cover 22B via shaft bearings, so as to be freely rotatable.

The clutch mechanism 5 can be switched between the clutch-on state, in which the rotation of the handle 20 can be transmitted to the spool 3, and the clutch-off state, in which the rotation of the handle 20 cannot be transmitted to the spool 3, by operation of the clutch operating member 50. In the clutch-on position, the rotation of a pinion gear is transmitted to the spool rotary shaft, resulting in the clutch-on state, and the pinion gear and the spool rotary shaft can integrally rotate. In the clutch-off position, the rotation of the pinion gear is not transmitted to the spool rotary shaft, resulting in the clutch-off state, and the spool 3 rotates freely.

As shown in FIG. 2, the clutch operating member 50 is a part for carrying out an operation to switch the clutch mechanism 5 between the clutch-on state and the clutch-off state.

The clutch operating member 50 is disposed at the rear of the reel body 2, between the right-side plate 21A and the left-side plate 21B, movable toward and away from the rear of the reel body 2 with respect to the fishing rod mounting portion 24. In the present embodiment, the clutch operating member 50 is provided so as to be pivotable about the spool rotary shaft.

The spool drive mechanism drives the spool 3 to rotate in the line winding (take-up) direction. Further, a drag force is generated against the spool 3 by the drag 27 during winding, thereby preventing fishing line breakage.

The drag 27 is coaxially installed on the handle shaft between the right-side cover 22A and the handle arm 25 of the handle 20. The spool drive mechanism includes the above-described motor 4, whose rotation in the winding direction is prohibited by an anti-reverse mechanism in the form of a roller clutch, not shown, and a rotation transmission mechanism that decelerates and transmits the rotation of the motor 4 to the spool 3 or accelerates and transmits the rotation of the handle 20 to the spool 3.

As shown in FIG. 3, the motor 4 is located at the front portion of the fishing reel 1A, in a more forward position than the spool 3 (see FIG. 2) in the front portion, and is covered by a half-split-shaped motor housing body 40.

A spool drive lever 28 is configured to be rotatable about a rotational axis C3 within a certain range of rotation in accordance with a user operation. The spool drive lever 28 is an actuator with which an operation is carried out to drive the spool 3 in the direction of rotation corresponding to the direction in which the fishing line is wound (take-up direction). The spool drive lever 28 is configured to change the rotational speed of the spool 3 in accordance with its rotational position. For example, if the spool drive lever 28 is rotated to the rearmost position (the frontmost position from the point of view of the user who performs the operation), the spool 3 is stopped, and as the lever is rotated forward from this position, the rotational speed of the spool is made to increase in a stepwise manner. The rotational speed of the spool 3 can be configured to increase linearly, rather than in a stepwise manner, as the spool drive lever 28 is rotated forward. In the following description, the embodiment in which the speed is changed in a stepwise manner will be described as an example.

Overview of Event Information Recording

In the fishing information processing system according to the present embodiment, the fishing reel 1A is equipped with various sensors. The fishing reel 1A is configured to detect and measure prescribed events using the outputs of the sensors, etc., thereby acquiring prescribed fishing information (reel information) related to the fishing reel 1A during actual fishing.

Reel information can include at least some of the following: information related to when the fishing reel 1A was used (for example, the date and time of use. Alternatively, it can be a season of a year divided into prescribed periods.), information related to the number of times that the fishing reel 1A has been used, information related to the spool 3 (for example, specification information such as the diameter of the spool), information related to a fishing line wound around the spool 3, information related to the drag settings, etc.

The reel information can also include information (reel operation information) related to the user's operation of the fishing reel 1A. For example, the reel operation information can include at least some of the following: information related to operation of the handle 20 (such as the number of revolutions (number of rotations), the rotation speed of the handle, etc.), information related to the on/off operation of the clutch mechanism (such as the number of on/off operations), information related to the operation of the drag 27 (such as information related to the drag force set by the operation), information related to the rotation of the spool 3 (such as the direction of rotation, rotation speed, the number of revolutions (number of rotations) of the spool 3, etc.).

The reel operation information can also include reel change information. The reel change information can include at least some of the following: information related to a change in tension on the fishing line wound on the spool 3, information related to a change in the fishing line in the direction of delivery (corresponding to the water depth of the lure measured based on the number of rotations of the spool 3), and information related to a change in the rotation of the handle 20.

The fishing reel 1A stores (accumulates, buffers) reel information acquired during actual fishing as accumulated information. The fishing reel 1A can buffer the accumulated information cyclically by overwriting previously accumulated information with respect to a prescribed storage capacity, for example, in the form of a ring buffer.

Further, the fishing reel 1A can store the accumulated information in such a way that divisions are indicated in the accumulated information in units of the throwing (casting) of the lure.

Specifically, for example, when the fishing reel 1A detects that the clutch mechanism 5 is off and the spool 3 is rotating freely in the line pay-out direction, the fishing reel can determine that lure casting has started and sets, according to the casting units, delimited positions for the accumulated information to be stored at the corresponding timing.

Moreover, the fishing reel 1A is configured to determine whether a prescribed event has occurred based on the outputs obtained from the sensors, etc., during actual fishing.

Examples of types of events include a fish being caught on a lure (a fish hit), a fish bite, landing a fish caught on a lure, breaking of the fishing line (a line break), snagging, and the like.

In the following description, for the sake of convenience of explanation, a case in which the event is a fish hit will be described as an example.

When the fishing reel 1A determines that an event has occurred (a fish hit), the fishing reel acquires the information accumulated for the period between the timing of the occurrence of the currently determined event and a set period of time prior thereto (information pertaining to the process leading up to the event, information pertaining to the cause of the occurrence of the event, etc.) as event information. The fishing reel 1A causes the acquired event information to be stored in a storage area different from that for the accumulated information.

In this manner, each time an event in which a fish hits occurs, the fishing reel 1A stores the corresponding event information. The event information can be stored without overwriting past information, as is the case with accumulated information.

The event information stored in the manner described above includes reel information for a period from a set period of time before the corresponding event occurs to the point in time that the event occurs. Specifically, depending on the reel information contained in the event information corresponding to a fish hit, for example, it indicates the history of the state of rotation (direction of rotation, rotation speed) of the spool 3 of the fishing reel 1A, water depth of the lure, movement (positional change) of the fishing reel 1A itself corresponding to the user's operation of the fishing rod 400 (rod action), etc., during a set period of time prior to the point at which the fish hit event occurred.

The event information described above indicates the water depth, reeling operation, rod action, etc., when a fish hits. If the water depth, rod action, fishing line reeling operation, etc., of the fishing reel 1A (the event occurrence conditions) when a fish hit are reproduced, the probability that a fish hit has occurred can be considered to have increased.

Thus, the user can, for example, operate the fishing reel 1A during actual fishing to call up and display the contents of the event information stored in the past. The user can confirm the contents of the displayed event information and fish so as to reproduce the confirmed water depth, reeling speed, rod action, etc. By making it possible for the user to fish in this way, fishing results can be expected to improve, increasing the enjoyment of fishing.

In the present embodiment, the event information stored in the fishing reel 1A can also be transmitted to the user terminal 500 via communication. The transmission of event information from the fishing reel 1A to the user terminal 500 can be triggered, for example, by the establishment of a communication connection between the fishing reel 1A and the user terminal 500, or by the user's operation of an event information transmission instruction, in a state in which a communication connection between the fishing reel 1A and the user terminal 500 has been established. The user terminal 500 can store event information transmitted in this manner.

The user can operate the user terminal 500 and cause the display unit of the user terminal 500 to display the contents of the event information stored in the user terminal 500. In this embodiment, the user can confirm what the contents of the event occurrence conditions were when a fish hit in the past at any location and on any occasion. In this manner, the user can check the conditions when the fish hit in the past (the process leading to the fish hit, the cause of the fish hit) and evaluate how to fish in future fishing trips, thereby increasing the enjoyment of fishing.

Example of the Functional Configuration of the Fishing Reel

Figure 4:
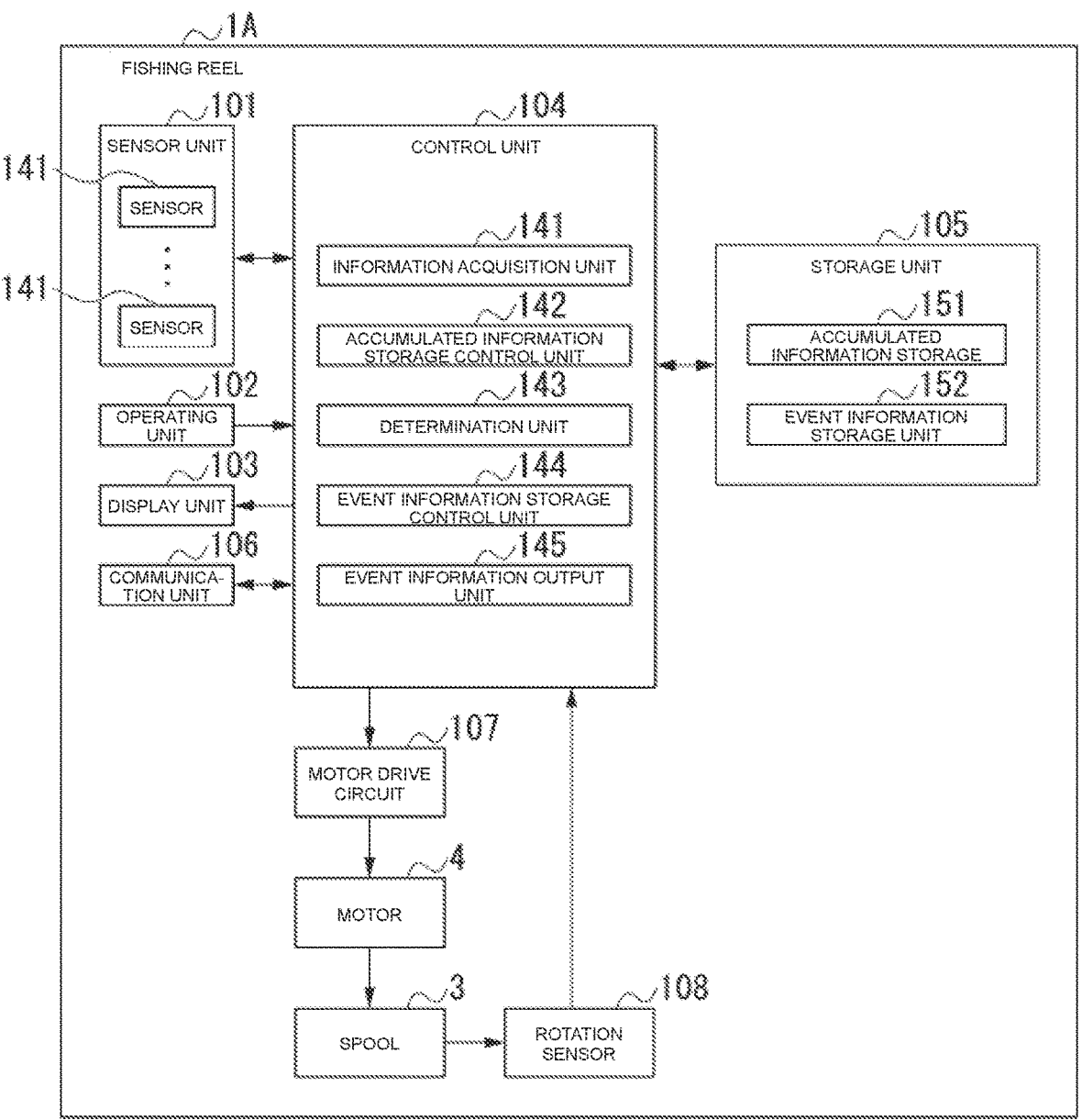
FIG. 4 is a diagram showing an example of the functional configuration of the fishing reel as an electric reel according to the first embodiment.

An example of the functional configuration of the fishing reel 1A as an electric reel will be described with reference to FIG. 4. In FIG. 4, the same parts as those in FIGS. 2 and 3 have been assigned the same reference symbols and descriptions thereof are omitted. The fishing reel 1 of FIG. 4 comprises a sensor unit 101, an operating unit 102, a display unit 103, a control unit (controller) 104, the storage unit 105, a communication unit 106, a motor drive circuit 107, the motor 4, the spool 3, and a rotation sensor 108.

The sensor unit 101 includes one or more prescribed sensors 111 disposed on the fishing reel 1. The sensors 111 can include a sensor for detecting the movement of the fishing reel 1 itself, a sensor for detecting vibration of the fishing reel 1, and the like. For example, angular velocity sensors, piezoelectric sensors, and the like can be used as the sensors 111 that detect movement and vibration of the fishing reel 1 in this manner.

The operating unit 102 includes parts of the fishing reel that are operated by the user, such as buttons, handles, levers, etc., provided on the fishing reel 1. In correspondence to FIG. 2, the operating unit 102 includes the button section 231.

The display unit 103 is the part that displays in accordance with the control of the control unit 104. In correspondence with FIG. 2, the display unit 103 includes the display surface section 232.

The control unit 104 executes various controls in the fishing reel 1. The functions as the control unit 104 are realized by a CPU (Central Processing Unit) disposed in the fishing reel 1 that executes a program.

The control unit 104 includes an acquisition unit 141, an accumulated information storage control unit (controller) 142, a determination unit 143, an event information storage control unit (controller) 144, and an event information output unit 145.

The acquisition unit 141 acquires information to be included in the accumulated information to be stored in an accumulated information storage unit 151. The acquisition unit 141 of the present embodiment acquires reel information.

The acquisition unit 141 can acquire the time of use of the fishing reel 1A as the reel information based on the date and time indicated by a clock function of the control unit 104.

Further, the acquisition unit 141 can be configured to count the number of times the fishing reel 1A has been used as the reel information by determining whether the fishing reel 1A has been used based on the output of an acceleration sensor, a vibration sensor, etc., disposed in the sensor unit 101 as the sensor 111.

Further, the acquisition unit 141 can acquire information related to the specifications, etc., of the spool 3 as the reel information from information related to the specifications, etc., of the spool 3 stored in the storage unit 105 in advance. Alternatively, the acquisition unit 141 can acquire, as the reel information, information related to the specifications, etc., of the spool 3 input by user operation of the operating unit 102.

Further, regarding information related to the fishing line wound around the spool 3 as the reel information, the acquisition unit 141 can acquire information such as the type and winding length of the fishing line input by user operation of the operating unit 102.

Further, regarding information related to the drag settings as the reel information, the acquisition unit 141 can acquire the drag force output by the sensor 111 that is disposed in the drag 27 and that detects the drag force. Alternatively, the acquisition unit 141 can acquire, as information related to the drag settings as the reel information, the drag force measured by the control unit 104 based on the detected operation of the drag 27 and the tension on the fishing line measured during interaction with a fish caught on a lure.

Further, the acquisition unit 141 can acquire information related to the operation of the handle 20, which is reel operation information included in the reel information, information related to the on/off operation of the clutch mechanism, information related to the operation of the drag 27, and information related to the rotation of the spool 3 in the following manner.

That is, the acquisition unit 141 can acquire information related to the operation of the handle 20 based on an output of the sensor 111 that detects rotation (rotational position) of the handle 20.

Further, the acquisition unit 141 can acquire information related to the on/off operation of the clutch mechanism based on an output of the sensor 111 provided to detect the on/off of the clutch mechanism.

Further, the acquisition unit 141 can acquire information related to changes in the drag force detected or measured with respect to the drag 27 and the timings of the changes, as information related to the operation of the drag 27.

Further, the acquisition unit 141 can acquire the direction of rotation and rotation speed of the spool 3 detected by the rotation sensor 108 as information related to the rotation of the spool 3, thereby acquiring the water depth of the lure measured based on the number of rotations of the spool 3 detected by the rotation sensor 108.

The accumulated information storage control unit 142 (one example of the second storage control unit) causes the accumulated information storage unit 151 (one example of the second storage unit) to continuously store the accumulated information. The accumulated information storage control unit 142 of the present embodiment causes the accumulated information storage unit 151 to store the reel information acquired by the acquisition unit and contained in the accumulated information.

Further, the accumulated information storage control unit 142 can cause the accumulated information storage unit 151 to function as a ring buffer with a prescribed storage capacity and cause the accumulated information storage unit 151 to cyclically store the accumulated information.

The determination unit 143 determines whether an event has occurred. As one specific example, the determination unit 143 can determine whether an event corresponding to a fish hit has occurred based on changes in the measured value (one example of reel change information) of the tension on the fishing line that has been unreeled from the spool 3. Further, for example, the determination unit 143 can determine that an event corresponding to a fish hit has occurred in response to determining that, from a state in which the fishing rod 400 and the fishing reel 1A are operated to attract fish, a fish has been hooked and the operation has shifted to an operation of the fishing rod 400 and the fishing reel 1A corresponding a fish hit. When it is determined that an event has occurred, the determination unit 143 is configured to identify the timing at which the event has occurred.

The event information storage control unit 144 extracts the accumulated information stored in the accumulated information storage unit 151 during a period (event information extraction period) between the time corresponding to the timing of the occurrence of the event identified by the determination unit 143 and a set period of time prior thereto.

When the accumulated information is stored in the accumulated information storage unit 151 divided into casting units, the delimited position from the previous cast can be included in the event information extraction period. In such a case, the event information storage control unit 144 can extract the accumulated information for the period from the time corresponding to the timing of the occurrence of the event to the delimited position from the previous cast.

The event information storage control unit 144 (one example of the first storage control unit) causes an event information storage unit 152 (one example of the first storage unit) to store the extracted accumulated information as event information.

The event information output unit 145 (one example of the transmission unit) executes a process related to the output of the event information stored in the event information storage unit 152.

Specifically, the event information output unit 145 can cause the display unit 103 to display the event information stored in the event information storage unit 152. At this time, the event information output unit 145 can display, from among the event information stored in the event information storage unit 152, the event information matching conditions specified by user operation.

Further, the event information output unit 145 (one example of the transmission unit) can cause the communication unit 106 to transmit the event information stored in the event information storage unit 152 to the user terminal 500. The event information output unit 145 can transmit the event information in response to the establishment of communication with the user terminal 500, for example. Alternatively, the event information output unit 145 can transmit event information matching conditions specified by the user's operation of the fishing reel 1A or the user terminal 500.

Further, the event information output unit 145 can delete event information transmitted to the user terminal 500 from the event information storage unit 152.

The storage unit 105 stores various types of information corresponding to the fishing reel 1. The storage unit 105 includes the accumulated information storage unit 151 and the event information storage unit 152.

The accumulated information storage unit 151 stores accumulated information in accordance with the control by the accumulated information storage control unit 142.

The event information storage unit 152 stores event information in accordance with the control by the event information storage control unit 144.

The communication unit 106 supports short-range wireless communication, for example, and is communicatively connected to the user terminal 500.

The motor drive circuit 107 drives the motor 4 in accordance with the control by the control unit 104. The control unit 104 changes the duty ratio of the pulse width of the motor drive signal by PWM (Pulse Width Modulation) control, thereby changing the rotation speed of the motor 4.

The rotation sensor 108 detects the number of revolutions of the spool (number of rotations), the rotation speed of the spool 3, etc.

Example of the Functional Configuration of the User Terminal

Figure 5:
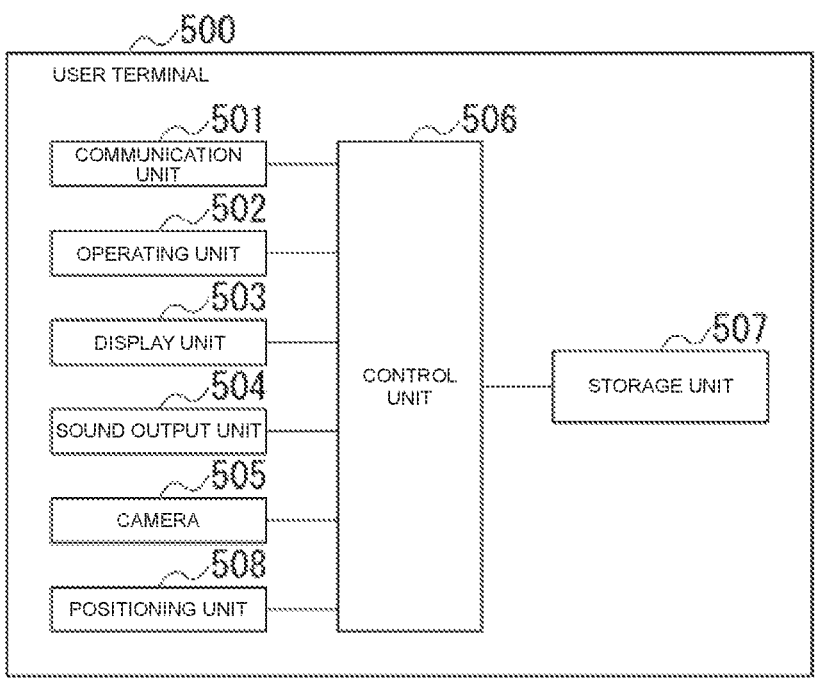
FIG. 5 is a diagram showing an example of the functional configuration of a user terminal in the first embodiment.

An example of the functional configuration of the user terminal 500 will be described with reference to FIG. 5. The user terminal 500 of the figure comprises a communication unit 501, an operating unit 502, a display unit (display) 503, a sound output unit 504, a camera 505, a control unit (controller) 506, a storage unit 507, and a positioning unit 508.

The communication unit 501 is a part corresponding to the communication function possessed by the user terminal 500. Specifically, the communication unit 501 supports short-range wireless communication and is connected to the fishing reel 1A, or the like within a communication range for communication. Further, the communication unit 501 supports network communication and connects to other terminals, servers, and other nodes via a network.

The operating unit 502 is a part that encompasses actuators and input devices disposed on the user terminal 500 or input devices connected to the user terminal 500.

The display unit 503 displays in accordance with the control of the control unit 506.

A touch panel with which it is possible to carry out operations on a display surface on which images are displayed in the user terminal 500 can be provided as the operating unit 502 and the display unit 503.

The sound output unit 504 outputs sound in accordance with the control by the control unit 506.

The camera 505 outputs captured images obtained by image capture.

The control unit 506 executes various controls in the user terminal 500. The functions as the control unit 104 are realized by the CPU provided in the user terminal 500 executing programs.

The storage unit 507 stores various types of information corresponding to the user terminal 500.

The positioning unit 508 measures the location of the user terminal 500 in accordance with a GPS (Global Positioning System), or the like and outputs position information indicating the measured position.

Example of the Processing Procedure

Figure 6:
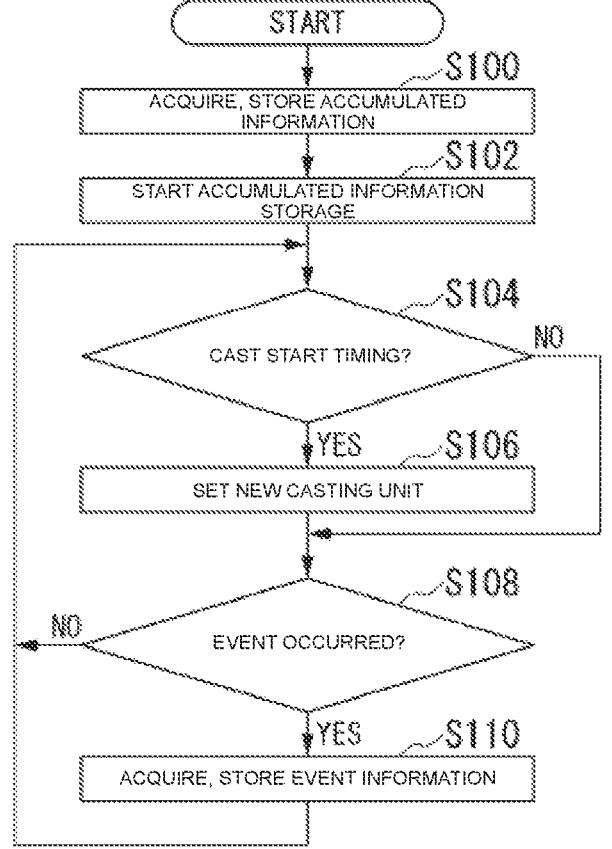
FIG. 6 is a flowchart showing an example of a processing procedure executed by the fishing reel in relation to the storage of event information according to the first embodiment.

An example of the processing procedure performed by the fishing reel 1A of the present embodiment in relation to the storage of event information will be described with reference to the flowchart of FIG. 6.

Step S100: In the fishing reel 1A, the acquisition unit 141 starts the acquisition of accumulated information including reel information, when the power is turned on, for example.

Step S102: The accumulated information storage control unit 142 starts control to cause the accumulated information storage unit 151 to store accumulated information acquired by the acquisition unit 141 in Step S100.

Step S104: After the storage of accumulated information is started in Step S102, the accumulated information storage control unit 142 determines whether a time at which casting has started has been reached.

Step S106: If it is determined in Step S104 that a time at which casting has started has been reached, the accumulated information storage control unit 142 sets, according to the casting unit, a new delimited position for the accumulated information at the time corresponding to the timing at which the casting was started.

Step S108: After the process of Step S106, or if it is determined in Step S104 that it is not a timing at which the casting was started, the determination unit 143 determines whether an event corresponding to a fish hit has occurred. If it is determined that an event has not occurred, the process returns to Step S104.

Step S110: If it is determined in Step S108 that an event has occurred, the event information storage control unit 144 acquires from the accumulated information storage unit 151 the accumulated information during the event information extraction period, starting from the timing at which the event occurred. The event information storage control unit 144 causes the event information storage unit 152 to store the acquired accumulated information as the event information.

Second Embodiment

The second embodiment will now be described. As shown in FIG. 1, in the second embodiment, the fishing rod 400 includes the fishing rod sensor unit 401. The fishing rod sensor unit 401 can be attached to the fishing rod 400 in an embedded manner in advance, or can be attached to the fishing rod 400 afterward.

The fishing rod sensor unit 401 includes one or more prescribed sensors and is configured to transmit detection information (rod information) output from the sensors to the fishing reel 1A via short-range wireless communication, for example. Each of the sensors disposed in the fishing rod sensor unit 401 can be provided at a prescribed part of the fishing rod 400 in accordance with the corresponding detection target.

Specifically, the rod information includes rod operation information indicating how the fishing rod 400 was operated by the user.

The rod operation information can include at least some of the following: information related to the speed of operation of the fishing rod 400 (for example, the casting speed during casting, the retrieval speed, etc.), information related to the vibration transmitted to the fishing rod 400 (for example, during a fish hit, at the time of reel operation, etc.), information related to the angle of the fishing rod 400 (for example, how the rod is held, the degree of bending of the rod, etc.), and information related to the orientation of the fishing rod 400 (for example, the direction of the tip of the rod).

Further, the rod operation information can include the following rod change information. The rod change information can include at least some of the following: information related to changes in the state of the fishing rod 400 (for example, changes due to the bending of the rod, changes due to damage to the rod, or the like), information related to changes in the speed of operation of the fishing rod 400 (for example, the casting speed or the pulling speed), information related to changes in vibration transmitted to the fishing rod 400 (for example, changes in vibration due to a fish hit, changes in vibration due to waves, changes in vibration due to reel operations, etc.), information related to changes in the angle of the fishing rod 400, and information related to changes in the orientation of the fishing rod 400.

The fishing rod sensor unit 401 can include an acceleration sensor, a piezoelectric sensor, and the like, at prescribed parts of the fishing rod 400 to obtain the rod operation information, as described above.

Further, the rod information can include, as information related to the usage history of the fishing rod 400, information related to time of use (for example, date and time) of the fishing reel 400 and/or information related to number of times that the fishing rod 400 is used. The fishing rod sensor unit 401 can determine whether the fishing rod 400 is being used by an acceleration sensor, piezoelectric sensor, etc., provided at a prescribed part of the fishing rod 400 and can obtain information related to the usage history of the fishing rod 400 based on the determination result.

Further, the rod information can include, as information related to the specifications of the fishing rod 400, at least one of the following: information related to the rigidity of the fishing rod 400, information related to the condition of the fishing rod 400, the number of joints, the number and material of guides, etc., of the fishing rod 400.

Such information related to the specifications of the fishing rod 400 can be stored in the fishing rod sensor unit 401 in advance.

In the present embodiment, when event information corresponding to an event of a fish hit is to be stored, of the information elements described above, rod action, orientation and bending of the fishing rod 400 (one example of an aspect of the fishing rod) corresponding to the circumstances, such as a fish being hooked, and rod change information that can be used to determine changes in vibration, etc., can be used as the rod information.

Specifically, the fishing rod sensor unit 401 can include an acceleration sensor that detects changes in the position of a prescribed portion of the fishing rod, as a sensor that detects changes in the orientation and bending of the fishing rod 400. Further, the fishing rod sensor unit 401 can include an acceleration sensor or a piezoelectric sensor provided at a prescribed part of the fishing rod sensor unit 401 as a sensor for detecting vibrations of the fishing rod 400.

Further, the rod information can be included in the determination of the event that the fishing rod 400 has broken, or in event information corresponding to an event in which the fishing rod 400 has broken. In this case, for example, the event information can include the tension on the fishing line, information pertaining to the condition and rigidity of the rod in the rod information, and the like. With such event information, it is possible to ascertain the relationship between the tension on the fishing line and strength of the rod until the fishing rod breaks.

The fishing rod sensor unit 401 is communicatively connected to the fishing reel 1A. The communication between the fishing rod sensor unit 401 and the fishing reel 1A can be wireless or wired, but wireless communication will be described as an example below. The wireless communication method between the fishing rod sensor unit 401 and the fishing reel 1A is also not particularly limited, and can be, for example, BLE, NFC, or the like.

In the present embodiment, the fishing rod sensor unit 401, which is communicatively connected to the fishing reel 1A, transmits information (rod information) output by its own sensor to the fishing reel 1A.

In the fishing reel 1A, the acquisition unit 141 acquires the rod information transmitted from the fishing rod sensor unit 401 as information to be included in the accumulated information, together with the reel information. The accumulated information storage control unit 142 causes the accumulated information storage unit 151 to store the accumulated information including the reel information and the rod information.

Further, when determining whether an event has occurred, the determination unit 143 of the fishing reel 1A can use the rod information in addition to the reel information acquired by the acquisition unit 141. By using the reel information and the rod information together in this manner, it is possible to increase the accuracy of the determination of whether an event has occurred.

When the determination unit 143 has determined that an event has occurred, the event information storage control unit 144 causes the event information storage unit 152 to store the event information including the reel information and the rod information from a prescribed time before the event occurrence timing. In this manner, as a result of the user confirming the event information including the reel information and the rod information, it is possible to accurately ascertain the situation, such as the rod action, as information leading to the fish hit (information pertaining to the cause leading up to the occurrence of the event).

Third Embodiment

The third embodiment will now be described. The present embodiment can be applied to both the first and second embodiments. In the following description, the case in which it is applied to the second embodiment will be described as an example.

In the present embodiment, the accumulated information accumulated in the accumulated information storage unit 151 also includes trip information, in addition to the reel information and the rod information. The trip information is information related to the user's fishing trips. Here, "fishing trip" can refer to the user's past actual fishing.

Trip information can include information (fishing trip history information) related to the history of actions as part of the fishing trip. The trip information can include at least some of the following: information related to the time of the fishing trip (for example, the fishing season, the date and time of the fishing trip, the fishing times), information related to the number of fishing trips (for example, the average number of fishing trips per year, the average number of fishing trips by month, the number of fishing trips according to specific location, etc.), and user location information (for example, GPS location information) indicating the location of the user during the fishing trip (at the time of actual fishing).

Further, the trip information can include information pertaining to the weather during actual fishing (fishing-trip weather information). The fishing-trip weather information can include at least some of the following: information pertaining to the local weather at the time of actual fishing (sunny, cloudy, rainy, etc.), information related to the local temperature at the time of actual fishing, information related to local air pressure at the time of actual fishing, information related to local wind direction/wind force (wind speed) at the time of actual fishing, and information related to tides at the time of actual fishing.

In the present embodiment, as an example, the trip information described above can be acquired as follows.

Each time the user fishes, at the fishing-trip destination, the user carries out an operation to declare (actual fishing declaration) that the user is going to actually fish, for example, to a fishing trip assistance application installed in the user terminal 500.

When an actual fishing declaration is made, the user terminal 500 can acquire the time of the fishing trip based on the current date and time, acquire information pertaining to the number of fishing trips based on the number of actual fishing declarations up to that point, and acquire, as the user location information, the location measured by the positioning unit 508 at the timing at which the actual fishing declaration is made.

Further, when an actual fishing declaration is made, the user terminal 500 can access a prescribed weather information site that provides weather information via a network and acquire weather information (weather, temperature, barometric pressure, wind direction/wind speed, tide information, etc.) corresponding to the current location and date and time. The weather information can change during the period of actual fishing corresponding to one actual fishing declaration. Further, if the user changes the location where he or she is fishing in accordance with one actual fishing declaration, the user location information can also change. Regarding trip information that could change with time under one actual fishing declaration, the user terminal 500 can be configured to transmit the current information to the fishing reel 1A at regular intervals or at the time at which a change occurs.

The user terminal 500 transmits the trip information acquired as described above to the fishing reel 1A. In the fishing reel 1A, the acquisition unit 141 acquires the transmitted trip information, and the accumulated information storage control unit 142 causes the accumulated information storage control unit 142 to the acquired fishing-trip-related information included in the accumulation information, together with the reel information and the rod information. Since the trip information is not information that indicates changes in real time, like the reel information and the rod information, the accumulated information storage control unit 142 can store the trip information in an area of the accumulated information storage control unit 142 different from the ring buffer. The trip information stored in this manner can be updated by the accumulated information storage control unit 142 each time it is transmitted from the user terminal 500 at regular intervals or at the timing at which a change occurs.

In the present embodiment, if the determination unit 143 in the fishing reel 1A determines that an event has occurred, the event information storage control unit 144 acquires the accumulated information from the accumulated information storage control unit 142, including the trip information in addition to the reel information and the rod information from a prescribed time before the event occurrence. The event information storage control unit 144 causes the event information storage unit 152 to store the acquired accumulated information as event information.

For example, in the case of an event corresponding to a fish hit, such event information of the present embodiment can indicate, in addition to patterns of operations of the rod action and the fishing reel 1A, the location, date and time (timing), weather, etc., when the fish hit, as the conditions when the fish hit. By displaying such event information on the fishing reel 1A or the user terminal 500, the user can confirm the conditions under which the fish hit, including the location, date and time, weather, etc., of the actual fishing, in addition to the way in which the fishing rod and the fishing reel were operated.

As a modified example of the present embodiment, the user terminal 500 can store the acquired weather information in its own storage unit 507 instead of transmitting this information to the fishing reel 1A.

Fourth Embodiment

The fourth embodiment will now be described. The fishing reel 1A used in the fishing information processing system of each of the embodiments described above is an electric reel. However, the fishing reel used in the fishing information processing system is not limited to an electric reel. In the fishing information processing system of the present embodiment, a dual-bearing reel (bait reel) is used as the fishing reel, as described below.

Figure 7:
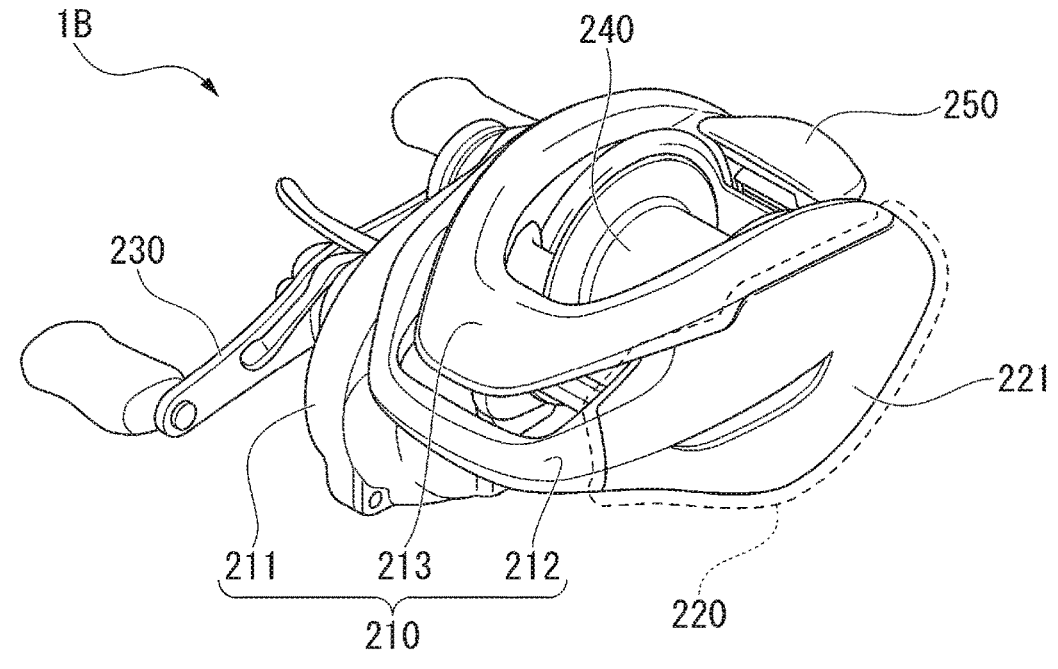
FIG. 7 is an example of the external appearance of the fishing reel as a dual-bearing reel according to a fourth embodiment.
Figure 8:
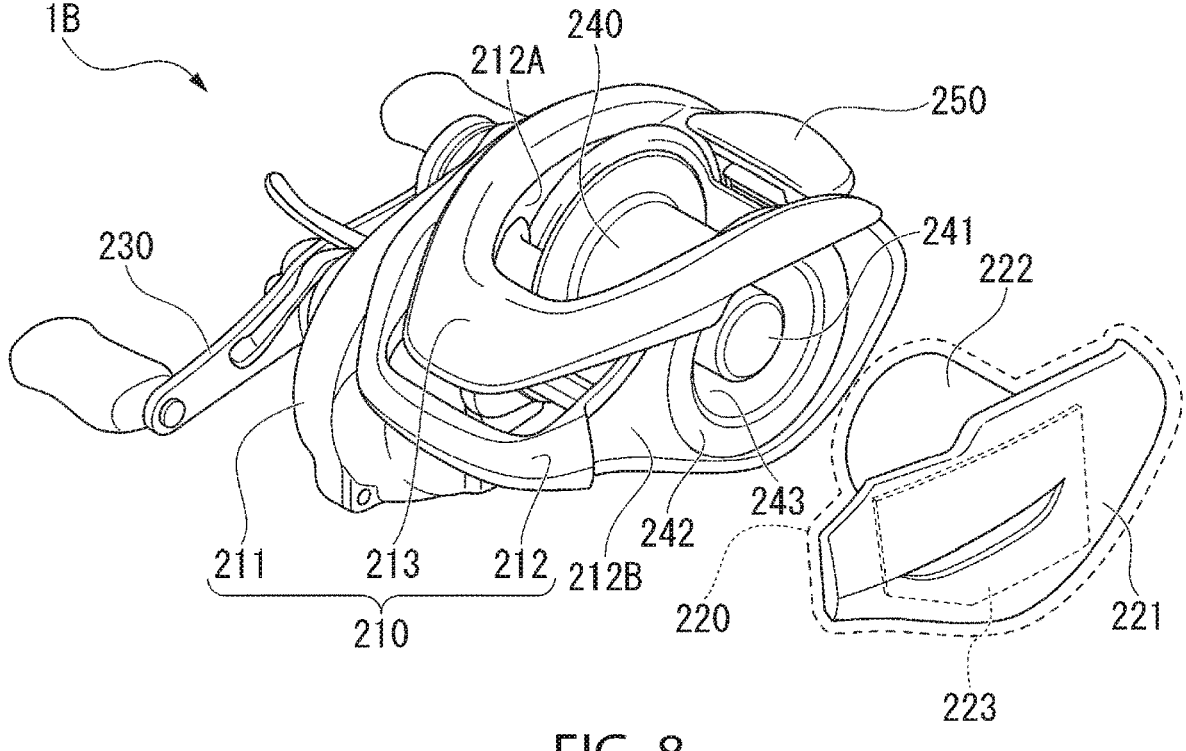
FIG. 8 is an example of the external appearance of the fishing reel as a dual-bearing reel according to the fourth embodiment.

FIGS. 7 and 8 show an example of the external appearance of a fishing reel 1B as a dual-bearing reel used in the fishing information processing system of the present embodiment. FIG. 7 shows an example of the external appearance of the fishing reel 1 with a detachable unit 220 attached to a main body 210. FIG. 8 shows an example of the external appearance of the fishing reel 1B with the detachable unit 220 removed from the main body 210.

The fishing reel 1B of the same figure comprises the main body 210, a handle 230, a spool 240, and a clutch operating unit 250.

The main body 210 includes main body 210 and the detachable unit 220. The main body 210 includes a side plate part 211, a frame part 212, and a thumb rest 213.

The frame part 212 includes a handle-side frame part 212A that rotatably holds one end of the spool shaft of the spool 240 and to which a handle shaft is attached, and a hold-side frame part 212B that rotatably holds the spool 240 at the other end of the spool shaft of the spool 240.

The detachable unit 220 can be attached to/detached from the main body 210. Specifically, the detachable unit 220 is disposed on the hold-side frame part 212B, which the side of the main body 210 that is opposite the handle 230.

When the detachable unit 220 is mounted on the main body 210 as shown in the figure, the main body 210 and a cover 221 of the detachable unit 220 form the contours of the fishing reel 1B.

As shown in the figure, the detachable unit 220 includes a braking unit part 222 that is integrated with the rear side of the cover 221. The braking unit part 222 houses a braking member that brakes the spool 240 that rotates freely during casting. The braking unit part 222 is integral with the housing of the detachable unit 220 including the cover 221.

When the detachable unit 220 is mounted on the main body 210, the braking unit part 222 is inserted into a circular spool space 243 between a spool shaft 241 and a spool periphery 242 on the side surface of the spool 240.

That is, the main body 210 rotatably holds one end of the spool shaft 241, and the detachable unit 220 rotatably holds the other end of the spool shaft 241.

A braking magnet is disposed on the spool shaft 241. The spool shaft 241 rotates together with the spool 240. When the detachable unit 220 is mounted on the main body 210 and the braking unit part 222 is inserted into the spool space 243, a brake unit in the braking unit part 222 is in a state in which a plurality of coils are arranged surrounding the outer circumference of the spool shaft 241. The plurality of coils are connected in series.

A circuit unit part 223 is housed inside the housing of the detachable unit 220.

The circuit unit part 223 includes a power supply circuit, a communication module, a braking circuit, a computer unit, etc.

The power supply circuit of the circuit unit part 223 contains a battery, for example, and outputs power from the battery to the communication module and the computer unit as a power source.

The communication module of the circuit unit part 223 has the function of communicating with an external communication device by a prescribed short-range wireless communication method. The short-range wireless communication method that the communication module supports is not particularly limited and can be BLE, NFC, etc. The communication module is operated by the power supplied from the power supply circuit.

The braking circuit in the circuit unit part 223 is composed of a circuit (braking circuit) corresponding to the braking control by the brake unit.

The braking circuit is configured to operate by the power generated in the coil of the brake unit in the braking unit part 222 in accordance with the rotation of the spool 240. Alternatively, the braking circuit can be operated by the power supplied by the power supply circuit.

The computer unit in the circuit unit part 223 executes control related to the storage of accumulated information and the storage and output of event information. The computer unit can be operated by the power supplied by the power supply circuit.

In the present embodiment, the housing of the detachable unit 220 is formed watertight. Since the circuit unit part 223 is housed (included) in the watertight housing of the detachable unit 220, the circuit unit part 223 will not be inundated with water.

The braking control of the brake unit of the fishing reel 1B according to the present embodiment is performed as follows.

Before casting a lure, the angler releases the clutch so that the spool 240 can rotate freely. In response to the cast, the spool 240 rotates in the direction in which the wound fishing line is paid out.

As the spool 240 rotates, the coil in the brake unit generates electricity, and the generated electricity is supplied to the circuit unit part 223. The braking circuit is activated by the power thus supplied.

Memory (a storage unit) provided in the fishing reel 1B stores parameters related to braking control (braking control parameters: for example, the braking mode and braking intensity) set by the angler. As braking control, the braking circuit sets the duty ratio of a PWM signal with a prescribed period for the brake switch provided in the path of the current flowing through the coil of the brake unit based on the combination of the braking mode and braking intensity that have been set, thereby performing on/off control.

The braking mode is a parameter that indicates a defined pattern of temporal changes in the duty ratio of the PWM signal. In each braking mode, the duty ratio decreases with time, but each braking mode has different maximum and minimum values in the duty ratio change range and different patterns of temporally decreasing duty ratio.

The braking intensity is a parameter that adjusts the intensity of braking under the set braking mode.

The number of braking modes and the number of braking intensities in the settings that can be selected are not particularly limited. For example, if the number of braking modes that can be selected is four and the number of braking intensities that can be selected is eight, 32 (4×8) combinations of braking modes and braking intensities are obtained. For each of the 32 combinations of braking mode and braking intensity, the pattern with which the duty ratio for braking the rotation of the spool 240 temporally changes will differ.

The braking circuit temporally changes the duty ratio of the PWM signal in accordance with the duty ratio per time determined by the set combination of the braking mode and braking intensity.

In this way, the braking circuit changes the duty ratio of the PWM signal to control the on/off time of the brake switch, thereby maintaining a suitable tension on the fishing line that is paid out from the spool 240 and preventing backlash.

Although not shown in FIGS. 7 and 8, one or more sensors are provided at prescribed positions on the fishing reel 1B. Further, although not shown in FIGS. 7 and 8, the fishing reel 1B can include actuators, such as dials, with which the braking control parameters can be changed.

Figure 9:
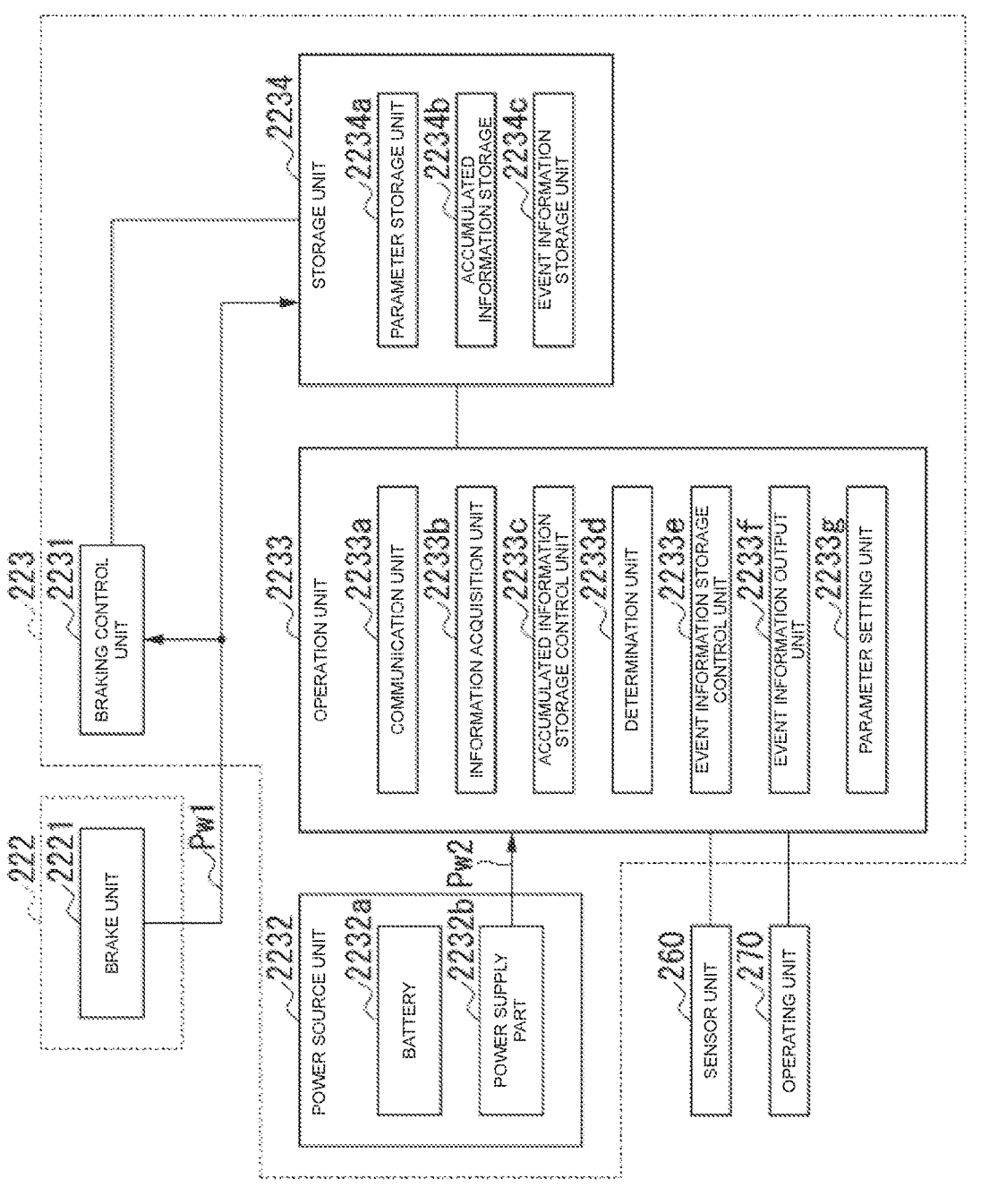
FIG. 9 is a diagram showing an example of the functional configuration of the circuit unit part according to the fourth embodiment.

FIG. 9 shows a functional configuration of the circuit unit part 223 of the fishing reel 1B. In the figure, the braking unit part 222, the sensor unit 260, and the operating unit 270 are shown together.

The sensor unit 260 includes one or more prescribed sensors disposed in the fishing reel 1B. Examples of sensors disposed in the fishing reel 1B include a sensor for detecting the state of rotation (the direction of rotation, the rotation speed) of the spool 240, a sensor for detecting positional changes in the fishing reel 1B itself, and a sensor for detecting vibrations of the fishing reel 1B.

The operating unit 270 is a part that includes actuators, such as dials, that the user operates when setting the braking control parameters.

The detachable unit 220 shown in FIG. 9 includes a braking unit 2221. The braking unit 2221 is housed in the braking unit part 222 and brakes the spool 240 during casting, in accordance with the control (PWM control) of a braking control unit 2231.

The braking unit 2221 can supply the electric power generated by the internal coil in accordance with the rotation of the spool 240 during casting as a power source (spool power source Pw1) to operate the circuits, etc., respectively corresponding to the braking control unit (controller) 2231 and a storage unit 2234.

Further, the detachable unit 220 includes the braking control unit 2231, a power supply part 2232, an operation unit 2233, and the storage unit 2234, as functional units realized by components mounted in the circuit unit part 223.

The braking control unit 2231 executes braking control. The circuit corresponding to the braking control unit 2231 in the circuit unit part 223 can be operated by receiving power supplied from the spool power source Pw1. The function as the braking control unit 2231 is realized, for example, by the execution of a program by a CPU installed in the circuit unit part 223.

When activated by receiving power supplied from the spool power source Pw1, the braking control unit 2231 reads the braking control parameters (braking mode, braking intensity) stored as set values in a parameter storage unit 2234a that is activated by receiving the same cast-compatible supply of power. The braking control unit 2231 sets the duty ratio for each time in accordance with the read out braking control parameters and controls the on/off time of the brake switch in the braking unit 2221 according to the set duty ratio, thereby braking the rotation of the spool 240.

The power supply part 2232 is configured so that a power supply unit 2232b can output, as a power source, the power output from a battery 2232a to the sensor unit 260, the operation unit 2233, the storage unit 2234, etc. The battery 2232a can be configured, for example, with a wirelessly rechargeable secondary battery.

The operation unit 2233 can be operated by receiving the power supplied from a power supply power source Pw2 from the power supply part 2232. The operation unit 2233 executes control related to the storage of accumulated information and the storage and output of event information. Further, the operation unit 2233 executes a process related to setting of the braking control parameters.

The operation unit 2233 includes a communication unit 2233a, an acquisition unit 2233b, an accumulated information storage control unit (controller) 2233c, a determination unit 2233d, an event information storage control unit (controller) 2233e, an event information output unit 2233f, and a parameter setting unit 2233g.

The communication unit 2233a is a communication module, for example, and is communicatively connected to the user terminal 500 and the fishing rod sensor unit 401 by short-range wireless communication, such as BLE and NFC.

Since the acquisition unit 2233b, the accumulated information storage control unit 2233c, the determination unit 2233d, the event information storage control unit (controller) 2233c, and the event information output unit 2233f have the same functions as the acquisition unit 141, the accumulated information storage control unit 142, the determination unit 143, the event information storage control unit 144, and the event information output unit 145 in FIG. 4, their descriptions are omitted.

The parameter setting unit 2233g sets the braking control parameters (braking mode, braking intensity) used for braking control in accordance with an operation performed on the operating unit 270, for example. When setting the braking control parameters, the parameter setting unit 2233g stores the set braking control parameters in the parameter storage unit 2234a.

The storage unit 234 stores prescribed fishing information. The hardware supported by the storage unit 234 can be a storage device, such as flash memory mounted on a circuit board, for example.

The storage unit 234 includes the parameter storage unit 2234a, an accumulated information storage unit 2234b, and an event information storage unit 2234c.

The parameter storage unit 2234a stores the braking control parameters set by the parameter setting unit 2233g.

The accumulated information storage unit 2234b stores accumulated information in accordance with control of the accumulated information storage control unit 2233c.

The event information storage unit 2234c stores event information in accordance with control of the event information storage control unit 2233e.

In the same manner as the fishing reel 1a of each of the embodiments described above, the fishing reel 1b as a dual-bearing reel configured in this way can store accumulated information including reel information, rod information, and trip information, in accordance with the user's actual fishing. In the case of a dual-bearing reel, the reel information can include the set values of the braking control parameters, information related to the braking control settings, such as a history of changes to the braking control parameters.

When storing the accumulated information, the fishing reel 1b can cause the accumulated information to be stored to show divisions in casting units, in accordance with on/off of the clutch mechanism, or the like. Further, the fishing reel 1b can store event information in response to the determination of the occurrence of an event, such as a fish hit. Further, the fishing reel 1b can transmit the stored event information to the user terminal 500 and cause the user terminal 500 to display the contents of the event information.

The fishing reel 1b as a dual-bearing reel can also include a display unit; in this case, it is also possible to display the contents of the event information pertaining to the display unit of the fishing reel 1b.

In the case of a dual-bearing reel, such as the fishing reel 1b, the reel can be configured to determine whether a backlash of the fishing line (or, a state that can be regarded as a backlash of the fishing line, even if it is not actually a backlash) during casting has occurred, for example. In this case, the determination unit 2233d can determine an event occurred corresponding to a backlash based on changes in the tension on the fishing line at the time of casting. Further, the accumulated information in this case is configured to include the set values of the braking control parameters and the speed of movement of the fishing rod. With event information that is obtained from such accumulated information, the user can ascertain the relationship between the intensity of the cast, the braking control parameter settings, etc., at the time of the backlash, and then reconsider the braking control parameter settings or casting technique in order to prevent the occurrence of backlash.

Fifth Embodiment

The fifth embodiment will now be described. In the fishing information processing system according to the present embodiment, a spinning reel is used as the fishing reel.

Figure 10:
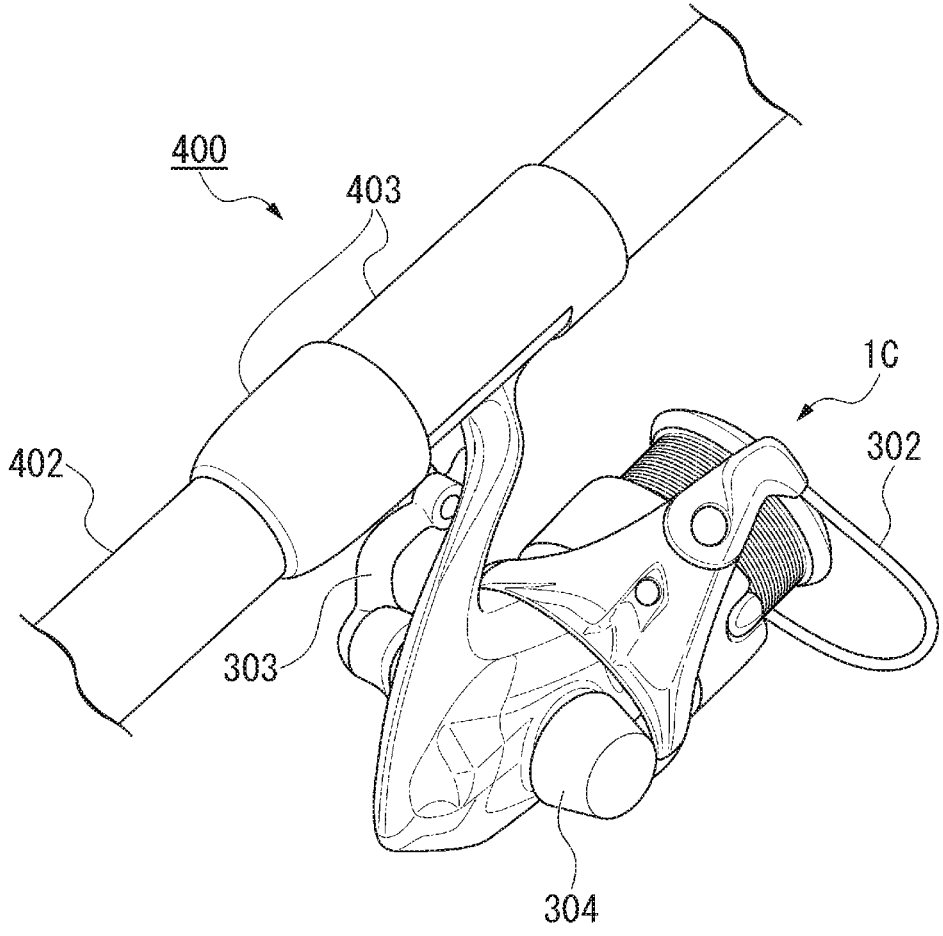
FIG. 10 is an example of the external appearance of the fishing reel as a spinning reel according to a fifth embodiment.

FIG. 10 shows an example of the external appearance of a fishing reel 1C as a spinning reel used in the fishing information processing system of the present embodiment. In the drawing, the fishing reel 1C as the spinning reel is shown attached to a reel mounting base (reel seat) 403 disposed on a rod body 402 of the fishing rod 400.

Although not shown, sensors are also provided at prescribed positions of the fishing reel 1C as a spinning reel. Examples of sensors installed in the fishing reel 1C include a sensor for detecting the state of rotation (direction of rotation, rotation speed) of the spool 301, a sensor for detecting the opening and closing of a bail arm 302, a sensor for detecting the state of operation (rotation speed) of a handle 303, a sensor for detecting positional changes in the fishing reel 1C itself, and a sensor for detecting vibration of the fishing reel 1C.

As an example of the functional configuration of the fishing reel 1C, the parts corresponding to the function of braking the rotation of the spool, such as the braking unit 2221 and the braking control unit 2231, can be omitted from the configuration of FIG. 9. The part serving as the circuit unit part according to the present embodiment can be provided so as to be housed in a handle cap 304, for example.

In the same manner as the fishing reel 1A, 1B of each of the embodiments described above, the fishing reel 1C as a spinning reel configured in this way can store accumulated information including reel information, rod information, and trip information, in accordance with the user's actual fishing. In this case, the fishing reel 1C can be made to store the accumulated information to indicate divisions in casting units, in accordance with the opening and closing of the bail arm 302, for example. Further, the fishing reel 1C can store event information in response to the determination of the occurrence of an event, such as a fish hit. Further, the fishing reel 1C can transmit the stored event information to the user terminal 500 and cause the user terminal 500 to display the contents of the event information.

Sixth Embodiment

The sixth embodiment will now be described. In the present embodiment, a configuration (event information processing function unit) corresponding to the sensor unit 101 shown in FIG. 4 (which can be the fishing rod sensor unit 401), the control unit 104 (acquisition unit 141, accumulated information storage control unit 142, determination unit 143, event information storage control unit 144, event information output unit 145), the storage unit 105 (accumulated information storage unit 151, event information storage unit 152), the communication unit 106, and the like, is disposed on the fishing rod.

In this embodiment, the fishing reel (1A, 1B, 1C) need not have functions as the control unit 104 and the storage unit 105. That is, the fishing reel (1A, 1B, 1C) need not store and output event information or accumulate accumulated information. The fishing reel 1A can transmit the acquired reel information to the event information processing function unit of the fishing rod.

The event information processing function unit of the fishing rod stores the accumulated information including the rod information, the transmitted reel information, and the trip information transmitted from the user terminal 500. The event information processing function unit of the fishing rod determines to occur an event, such as a fish hit, and stores the corresponding event information in response to the determination of the occurrence of the event. The event information processing function unit of the fishing rod transmits the event information to the user terminal 500. The user terminal 500 displays the event information received from the event information processing function unit of the fishing rod.

Modified examples of each of the embodiments described above will be described below.

The determination unit (143, 2233*d*) can determine each of a plurality of different types of events. In this case, the event information output unit (145, 2233*f*) can display or transmit the event information of a type specified by a user operation, for example, from among the stored event information.

In each of the embodiments described above, the accumulated information includes at least reel information, and, in addition to the reel information, includes rod information and/or trip information. However, the accumulated information can include at least the rod information, and also include reel information and/or trip information. Alternatively, the accumulated information can include at least trip information, and also include reel information and/or rod information.

The event information output unit (145, 2233*f*) can output, in addition to event information, the accumulated information stored in the accumulated information storage unit (151, 2234*b*) by the display on the display unit 103 or transmission to the user terminal 500. Further, the event information output unit can output accumulated information without outputting event information.

After transmitting the accumulated information stored in the accumulated information storage unit and the event information (one example of information based on accumulated information) stored in the event information storage unit of one user's fishing reel to the user terminal 500, the information can be transmitted to be shared with other users' user terminals.

The above-described processes as the fishing reel (1A, 1B, 1C), the fishing rod sensor unit 401, the user terminal 500, and the event information processing function unit, etc., can be performed by storing a program for realizing the above-described functions as the fishing reel (1A, 1B, 1C), the fishing rod sensor unit 401, the user terminal 500, and the event information processing function unit, etc., in a computer-readable storage medium, and having a computer system read and execute the program that is stored on this storage medium. Here, "having a computer system read and execute the program that is stored on this storage medium" includes the installation of the program in the computer system. The "computer system" here includes the OS and hardware such as peripheral devices. Further, the "computer system" can also include a plurality of computer devices that are connected via a network, including the Internet and communication lines such as WAN, LAN, and dedicated lines. Further, the "computer-readable storage medium" refers to storage devices such as portable media such as flexible discs, magneto-optical discs, ROM, CD-ROM, HDD, etc., that are incorporated in the computer system. In this manner, the storage medium that stores the program can be a non-transitory storage medium, such as a CD-ROM. Further, the storage medium includes an internally or externally provided storage medium that can be accessed from a distribution server in order to distribute the aforementioned program. The program code that is stored on the storage medium of the distribution server can differ from the program code that is in a form executable by the terminal device. That is, as long as the program can be downloaded from the distribution server and installed in a form executable by the terminal device, the form in which the program is stored in the distribution server is not limited. The program can be divided into a plurality of modules and merged on the terminal device after downloading at different timings, or the distribution server that distributes each of the divided programs can be different. Moreover, the "computer-readable storage medium" shall also include media that retains the program for a set period of time, such as volatile memory (RAM) in the computer system which acts as the server or the client when the program is transmitted via the network. Further, the above-described program can realize some of the above-described functions. Moreover, it can be a program that can realize the above-described functions in combination with a program already stored in the computer system, i.e., a so-called difference file (difference program).

What is claimed is:

1. A fishing information processing system, comprising:
an acquisition unit configured to acquire prescribed fishing information;
a determination unit configured to determine an event occurred, based on the prescribed fishing information acquired by the acquisition unit;
a first storage control unit that causes a first storage unit to store the prescribed fishing information, from a prescribed time before a time determination by the determination unit that the event has occurred, as event information; and
a second storage control unit configured to cause a second storage unit to continuously store the prescribed fishing information acquired by the acquisition unit as accumulated information,
the first storage control unit is configured to extract the accumulated information stored in the second storage unit between the prescribed time and the occurrence of the event, and cause the first storage unit to store the extracted accumulated information as the event information, the first storage unit being different from the second storage unit.

2. The fishing information processing system according to claim 1, wherein
the prescribed fishing information acquired by the acquisition unit is reel information related to a fishing reel.

3. The fishing information processing system according to claim 2, wherein
the reel information includes at least some of: information related to when the fishing reel was used, information related to a number of times that the fishing reel is used, information related to a spool of the fishing reel, information related to fishing line wound around the spool of the fishing reel, information related to brake control settings of the fishing reel, and information related to drag settings of the fishing reel.

4. The fishing information processing system according to claim 2, wherein
the reel information is reel operation information related to an operation carried out with respect to the fishing reel.

5. The fishing information processing system according to claim 4, wherein
the reel operation information includes at least some of: information related to operation of a handle of the fishing reel, information related to operation of a clutch of the fishing reel, information related to operation of a drag of the fishing reel, and information related to rotation of a spool of the fishing reel.

6. The fishing information processing system according to claim 4, wherein
the reel operation information includes reel change information, including at least some of: information related to changes in tension on a fishing line wound around a spool of the fishing reel, information related to changes in the fishing line in a line pay-out direction, and information related to changes in rotation of a handle of the fishing reel.

7. The fishing information processing system according to claim 6, wherein
the determination unit is configured to determine the event occurred based on the reel change information.

8. The fishing information processing system according to claim 1, wherein
the prescribed fishing information acquired by the acquisition unit is rod information related to a fishing rod.

9. The fishing information processing system according to claim 8, wherein
the rod information includes at least some of: information related to when the fishing rod was used, information related to a number of times that the fishing rod was used, information related to a rigidity of the fishing rod, and information related to the condition of the fishing rod.

10. The fishing information processing system according to claim 8, wherein
the rod information is rod operation information related to operation of the fishing rod.

11. The fishing information processing system according to claim 10, wherein
the rod operation information includes at least some of: information related to a speed of operation of the fishing rod, information related to vibration transmitted to the fishing rod, information related to an angle of the fishing rod, and information related to an orientation of the fishing rod.

12. The fishing information processing system according to claim 10, wherein
the rod operation information includes rod change information, including at least some of: information related to changes in a state of the fishing rod, information related to changes in a speed of operation of the fishing rod, information related to changes in vibration transmitted to the fishing rod, information related to changes in an angle of the fishing rod, and information related to changes in an orientation of the fishing rod.

13. The fishing information processing system according to claim 12, wherein
the determination unit is configured to determine the event occurred based on the rod change information.

14. The fishing information processing system according to claim 1, wherein
the prescribed fishing information acquired by the acquisition unit is trip information related to fishing trips.

15. The fishing information processing system according to claim 14, wherein
the trip information includes at least some of: information related to a timing of the fishing trip, information related to a number of fishing trips, information related to a location of the fishing trip, information related to a temperature during the fishing trip, information related to weather during the fishing trip, information related to a barometric pressure during the fishing trip, information related to a wind direction during the fishing trip, and information related to a wind force or wind speed during the fishing trip.

16. The fishing information processing system according to claim 1, further comprising a transmission unit configured to transmit the accumulated information or the event information to an external device.

17. A fishing reel comprising:

the fishing information processing system according to claim 1.

18. A fishing rod comprising:

the fishing information processing system according to claim 1.

19. A fishing information processing program stored on a non-transitory medium which when executed by a processor causes a computer to function as the fishing information processing system according to claim 1.

\* \* \* \* \*